United States Patent [19]

Oldershaw

[11] Patent Number: 5,278,676
[45] Date of Patent: Jan. 11, 1994

[54] METHOD AND APPARATUS FOR CYCLIC SCANNING OF IMAGES

[75] Inventor: Robert J. Oldershaw, Norfolk, England

[73] Assignee: Crosfield Electronics Ltd., England

[21] Appl. No.: 618,439

[22] Filed: Nov. 27, 1990

[30] Foreign Application Priority Data

Nov. 27, 1989 [GB] United Kingdom ............... 8926738

[51] Int. Cl.⁵ ............................................. H04N 1/06
[52] U.S. Cl. .................................... 358/487; 358/489
[58] Field of Search ............... 358/471, 474, 486, 487, 358/491, 475, 483, 490, 444, 409, 489, 493, 404; H04N 1/10, 1/16

[56] References Cited

U.S. PATENT DOCUMENTS

| | | | |
|---|---|---|---|
| 3,541,245 | 11/1970 | Wilby | 358/489 |
| 4,280,145 | 7/1981 | Norrell | 358/489 |
| 4,288,820 | 9/1981 | Minamibayashi et al. | 358/483 |
| 4,363,037 | 12/1982 | Taudt . | |
| 4,367,493 | 1/1983 | Matteson | 358/409 |
| 4,475,131 | 10/1984 | Nishizawa et al. . | |
| 4,540,901 | 9/1985 | Suzuki | 358/483 |
| 4,651,227 | 3/1987 | Yunoki et al. . | |
| 4,816,923 | 3/1989 | Saotome | 358/489 |

OTHER PUBLICATIONS

Patent Abstracts of Japan, vol. 11, No. 88, Application No. 61-242067, Mar. 18, 1987.
Patent Abstracts of Japan, vol. 8, No. 8, Application No. 58-173965, 58-173966, 58-173967 Jan. 13, 1984.

*Primary Examiner*—Stephen Brinich
*Assistant Examiner*—Kim Yen Vu
*Attorney, Agent, or Firm*—Sughrue, Mion, Zinn, Macpeak & Seas

[57] ABSTRACT

Image scanning apparatus comprises a radiation source to generate a radiation beam, a support on which an original image is mounted in use so that the radiation beam is incident, in use, on the original image, the support and the beam being continuously movable relative to one another in a cyclic manner to expose successive scan lines on the original image. A detector is provided for detecting the radiation beam after exposure to the original image. A buffer receives image signals corresponding to a valid scan line of the original image at a first rate from the detector during exposure of the scan line and outputs all the image signals corresponding to a valid scan line at a second slower rate to a processor within one cycle of the relative motion between the support and the radiation beam. The buffer is prevented from storing signals from the detector when a valid scan line of the original image is not being exposed.

10 Claims, 1 Drawing Sheet

METHOD AND APPARATUS FOR CYCLIC SCANNING OF IMAGES

FIELD OF THE INVENTION

The invention relates to a method of and apparatus for scanning an original image, for example where the image is scanned using a radiation beam.

DESCRIPTION OF THE PRIOR ART

In image scanning apparatus incorporating a drum scanner, the dimensions of the cylinder on which the original image is mounted are determined as much by mechanical structural considerations as by the need to have a mounting surface for original images. Hence, the resulting dimensions are much larger than is required for small originals requiring high resolution scanning, such as 35 mm transparencies. In this type of apparatus the image data is collected by a photo multiplier tube and the signals produced are then serially processed in real time. It is the processing of the signals which limits the system data rate and ultimately the scanner productivity. Typically, the limitations are produced by the logarithmic processing necessary and by the analogue to digital conversion. If an attempt is made to increase the rate of data processing, a compromise inevitably has to be made in the signal dynamic range and this is unacceptable.

U.S. Pat. No. 4,475,131 describes an image scanning system which enables an image to be displayed on a CRT at one speed while at the same time being recorded on a separate recorder. This is achieved by providing separate recording means which supplies image signals at the required speeds to the CRT and recording device. This is a relatively complex arrangement and in any event does not address the problem with which the present invention is concerned, namely optimising the speed at which an image can be scanned despite the relatively slow downstream processing which is necessary.

JP-A-61242067 describes a special form of CCD which enables optical pulses to be sampled at high speed and to be read at low speed. This requires a special CCD array to be provided and is not readily useful with conventional image scanning apparatus.

SUMMARY OF THE INVENTION

In accordance with one aspect of the present invention, a method of scanning an original image comprises mounting the original image on a support, exposing successive scan lines of the original image to a radiation beam by causing continuous relative cyclic motion between the support and the radiation beam; detecting the radiation after exposure to produce image signals; storing those image signals corresponding to a valid scan line of the original image at a first rate in a buffer during exposure of the scan line and outputting all the image signals received by the buffer corresponding to the valid scan line at a second slower rate within one cycle of the relative motion between the support and the radiation beam; and preventing the buffer from storing signals when a valid scan line of the original image is not being exposed.

In accordance with another aspect of the present invention, image scanning apparatus comprises a radiation source to generate a radiation beam, a support on which an original image is mounted in use so that the radiation beam is incident, in use, on the original image, the support and the beam being continuously movable relative to one another in a cyclic manner to expose successive scan lines on the original image; and a detector for detecting the radiation beam after exposure to the original image, a buffer for receiving image signals corresponding to a valid scan line of the original image at a first rate from the detector during exposure of the scan line and from which all the image signals corresponding to a valid scan line are output at a second slower rate to a processor within one cycle of the relative motion between the support and the radiation beam; and means to prevent the buffer from storing signals from the detector when a valid scan line of the original image is not being exposed.

The problems of the prior art scanners have been overcome by taking advantage of the significant time available when the image is not being scanned during a scan cycle. This enables the signals representing the original image to be processed after a respective scan line of the image has been exposed and before the next scan line is exposed.

Preferably, the apparatus has a plurality of buffers for storing image signals representing a corresponding number of colour channels.

The image scanner may be a drum scanner with the image being mounted on the external (or internal) curved surface of the drum. The speed of rotation of the drum can be such that the rate at which image signals are stored in the buffer is greater than the maximum rate at which the processor is capable of processing the image signals. However, for a proportion of a scan, the radiation beam will expose the drum and so this period can be used to process the image data.

In the preferred embodiment, the buffer is a charge coupled device. Preferably, the charge coupled device has at least two modes, one mode being activated to store the image signals in the buffer and the second mode being to output signals from the buffer to the processor. Preferably when the buffer is switched to the second mode it is prevented from storing data signals.

Alternatively, a shutter arrangement could be provided to prevent the beam reaching the detector when the is not being scanned.

In the preferred embodiment, the detector is a photomultiplier tube and the processor carries out analogue to digital conversion and logging processes.

However, in another embodiment, the image scanner is a flat bed scanner in which the radiation beam is reflected from a multi-faceted mirror which rotates so as to scan the radiation beam across the original image, as the flat bed on which the image is mounted moves continuously relative to the rotating mirror. In this example there will be periods when the radiation beam does not expose valid scan lines and these periods can be used to process the image data.

Typically, the radiation beam comprises radiation in the visible part of the spectrum.

The term "valid scan line" means a scan of the image during which valid image signals are generated by the detector.

BRIEF DESCRIPTION OF THE DRAWINGS

An example of image scanning apparatus and a method of scanning an original image according to the invention will now be described with reference to the accompanying drawings, in which.

DETAILED DESCRIPTION OF THE EMBODIMENT

Figure 1:
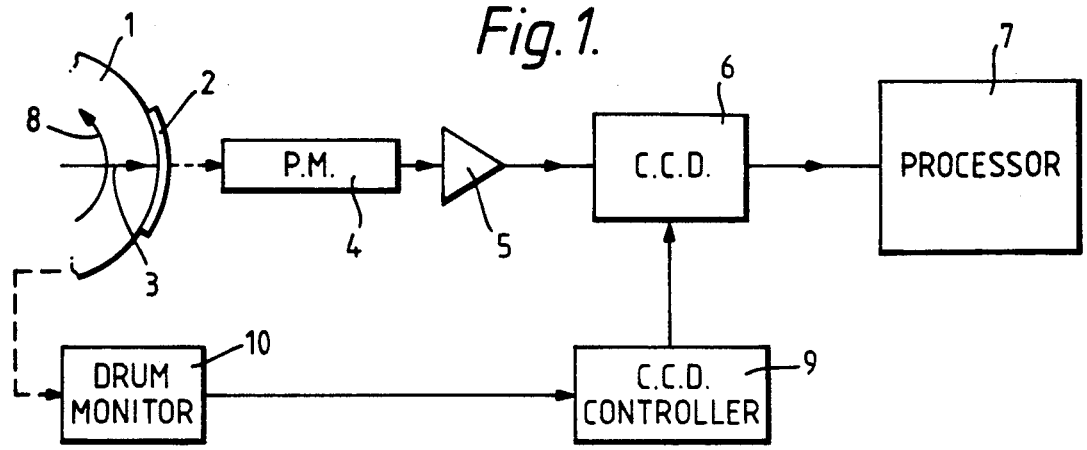
FIG. 1 is a schematic diagram of the apparatus.

An optically transparent cylinder 1 of a conventional drum scanner has an original image in the form of a 35 mm transparency 2 mounted on its external surface (FIG. 1). The cylinder 1 rotates in an anti-clockwise direction as indicated by the arrow 8, about its central axis (not shown). A visible radiation beam 3 from a source (not shown) such as a laser impinges on the internal surface of the cylinder 1 and passes through the cylinder 1 to the transparency 2. After passing through the transparency 2 the radiation beam 3 is detected by a photomultiplier tube 4. The photomultiplier tube 4 converts the radiation detected into a current signal which corresponds to the amplitude of the detected radiation. The photomultiplier tube 4 then outputs this signal to a current to voltage converter 5. This converts the current output signal from the photomultiplier tube 4 into a voltage signal and outputs the voltage signal to a buffer which in this example is a charge coupled device (CCD) 6.

The CCD 6 can store signals at a rate of up to 10 MHz. However, in the example the CCD 6 stores data at a rate of only about 1 MHz. The CCD 6 has two modes, in the first mode it stores voltage signals from the current to voltage converter 5 and in the second mode it outputs the stored signals to a processor 7. The processor 7 carries out analogue processes on the signals from the CCD 6, such as level shifting and logging. The processor 7 then converts the resulting analogue signals to digital signals. The CCD 6 can be switched to accept or not accept data in accordance with the type of signals received from the current to voltage converter 5.

Conventionally, there is no buffer 6 between the current to voltage converter 5 and the processor 7. Hence, the rate at which the image 2 may be scanned is determined by the processing rate of the processor and the number of samples taken from the transparency for every millimeter of a scan line of the transparency. Typically, the processing rate of the processor 7 is about 400 KHz and the number of samples is about 70 per millimeter. As the transparency is a 35 mm transparency, the number of samples in one 35 mm scan line is about 2450. The speed at which one line can be scanned is limited by the processing rate of the processor. Hence, the time to scan one 35 mm line is the number of samples in one line divided by the data processing rate of the processor. This gives a time of approximately 6 ms to scan one 35 mm line. A conventional drum scanner has a circumference of approximately 360 mm and so the time for one revolution of the drum is about 63 ms. Therefore, the speed of rotation of the drum is approximately 1000 revolutions per minute.

However, for each revolution of the drum there is only 35 mm of the total 360 mm of the drum surface during which processing takes place. Hence, for 325 mm of each revolution the processing electronics are not being used.

However, with a buffer such as the CCD 6 inserted between the current voltage converter 5 and the processor 7, as shown in FIG. 1, the 2450 samples in one 35 mm line of the transparency 2 can be stored by the CCD 6 at a rate of up to 10 MHz. The CCD can then output the samples to the processor 7 for processing during the 325 mm of rotation of the drum 1 which occurs when the 35 mm transparency 2 is not being scanned. As it takes 6 ms to process all 2450 samples, the 6 ms can be spread over a rotational distance of 325 mm instead of a rotational distance of only 35 mm.

Therefore the time for the drum to rotate can be reduced to about 6.7 ms. Hence, the speed of rotation of the drum can be increased to around 9000 revolutions per minute. This gives an increase in data processing productivity of around 900%.

Figure 2:
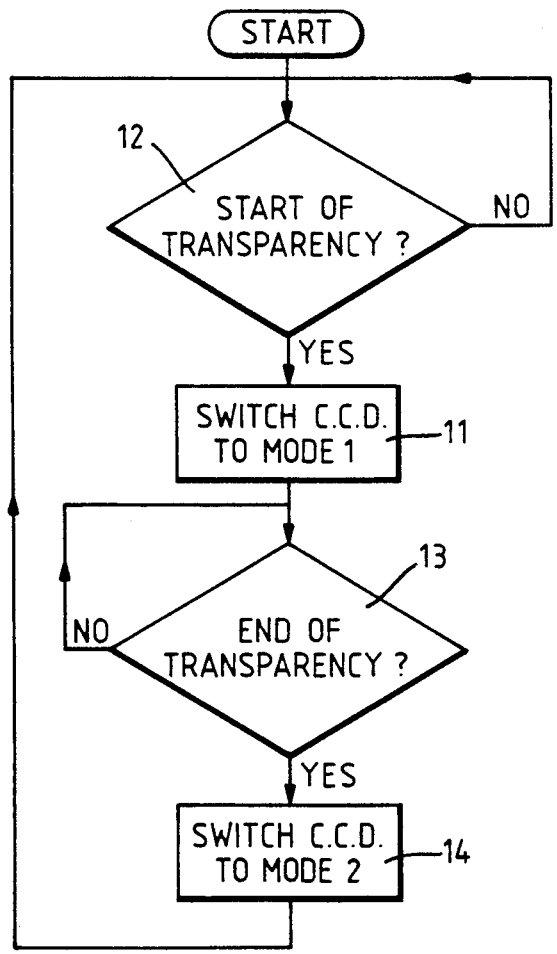
FIG. 2 is a flow diagram illustrating operation of the apparatus.

In use, the 35 mm transparency 2 is mounted on the external surface of the cylinder 1 of the drum scanner and the cylinder is rotated in an anti-clockwise direction, as indicated by the arrow 8. The CCD 6 is switched by a CCD controller 9 to accept image voltage signals (Mode 1) from the photomultiplier tube 4 via the current to voltage converter 5 (step 11, FIG. 2) when the start of the transparency 2 is detected (step 12). The position of the cylinder 1 and hence the transparency 2 is determined by a conventional monitor 10 connected to a timing disc arrangement (not shown) coupled for rotation with the drum 1. When the cylinder has rotated so that the end of the transparency 2 is detected (step 13) as determined by the monitor 10, the CCD 6 is switched by the controller 9 (step 14) so that it does not accept any signals from the photomultiplier tube 4 via the current to voltage converter 5 (Mode 2). When this occurs the CCD 6 is simultaneously switched to output the image signals stored during the previous scan line to the processor 7 at a rate of 400 KHz to enable the processor 7 to process the image signals while the radiation beam 3 is scanning the section of the cylinder 1 which does not have the transparency 2 mounted on it. By the time the cylinder 1 has rotated so that the next scan line of the transparency 2 is about to be scanned the CCD 6 has output all of the image signals from the previous scan line to the processor 7.

When the radiation beam 3 starts to scan the next scan line of the transparency 2 the CCD 6 is switched by the controller 9 to enable it to accept and store image signals, and the process continues until all the scan lines on the transparency 2 have been scanned and processed.

Although in the example described above the CCD 6 only outputs image signals to the processor 7 when the transparency 2 is not being scanned, it is possible that the image signals could start to be processed before the radiation beam 3 has finished scanning the respective scan line.

Although the example above has been illustrated using a 35 mm transparency a similar principle can be applied to most sizes of transparency which does not cover the entire circumference of the cylinder 1.

I claim:

1. A method of scanning an original image, the method comprising mounting the original image on a support, exposing successive scan lines on the support and image to a radiation beam by causing continuous relative cyclic motion between said support and said radiation beam such that each of said scan lines defines a valid portion and an invalid portion, said valid portion corresponding to the scanning of said image; detecting the radiation after exposure to produce image signals; storing those of said image signals corresponding to a valid portion of each of said scan lines at a first rate in a buffer during exposure of each scan line and outputting all the image signals received by said buffer corresponding to said valid portion of each of said scan lines at a second slower rate within the cycle of the relative motion between said support and the radiation beam; and preventing said buffer from storing signals corresponding to an invalid portion of a scan line.

2. A method according to claim 1, wherein said buffer is operable in a first mode to store signals and in a second mode to output stored signals.

3. A method according to claim 1, further comprising monitoring said relative cyclic motion between said support and said radiation beam to determine when said radiation beam is exposing said original image and preventing said buffer from storing signals where it is detected that the relative positions between said support and said radiation beam are such that the original image is not being exposed to said radiation beam.

4. Image scanning apparatus comprising a radiation source to generate a radiation beam, a support on which an original image is mounted so that the radiation beam is incident on the original image, said support and said bean being continuously movable relative to one another in a cyclic manner to expose successive scan lines of said support and image such that each of said scan lines defines a valid portion and an invalid portion, said valid portion corresponding to the scanning of said image; and a detector for detecting said radiation beam after exposure to the original image and support, a buffer for receiving image signals corresponding to a valid portion of a scan line at a first rate from said detector during exposure of each scan line and from which all the image signals corresponding to a valid portion of a scan line are output at a second slower rate to a processor within one cycle of the relative motion between the support and the radiation beam; and means to prevent said buffer from storing signals from the detector corresponding to an invalid portion of a scan line.

5. Apparatus according to claim 4, the apparatus having a plurality of buffers for storing image signals representing a corresponding number of colour channels.

6. Apparatus according to claim 4, wherein said buffer is a charge coupled device.

7. Apparatus according to claim 6, wherein said charge coupled device (CCD) is operable in two modes, one mode being activated to store the image signals in the CCD and the second mode being activated to output stored signals from the CCD to a processor.

8. Apparatus according to claim 7, wherein when said CCD is switched to said second mode it is prevented from storing image signals.

9. Apparatus according to claim 4, further comprising monitoring means for monitoring the relative movement between said support and said beam and for determining the relative positions between said beam and said original image whereby said buffer is prevented from storing signals from the detector when said original image is not being exposed to said radiation beam.

10. Apparatus according to claim 4, wherein said support comprises a rotatable cylinder.

* * * * *